W. C. PARTLOW.
VEHICLE-HUB.

No. 177,881. Patented May 23, 1876.

Witnesses:
Gren. Lewis
W. E. Chaffee

Inventor
W. C. Partlow
per Nealy & Co.

UNITED STATES PATENT OFFICE.

WYMAN C. PARTLOW, OF BRANDON, VERMONT.

IMPROVEMENT IN VEHICLE-HUBS.

Specification forming part of Letters Patent No. 177,881, dated May 23, 1876; application filed December 7, 1875.

*To all whom it may concern:*

Be it known that I, W. C. PARTLOW, of Brandon, in the county of Rutland and State of Vermont, have invented certain new and useful Improvements in Vehicle-Hubs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to an improvement in vehicle-hubs; and it consists in the arrangement and combination of parts that will be more fully described hereinafter, whereby a cheap, simple, and durable wooden hub is produced.

Figure 1:
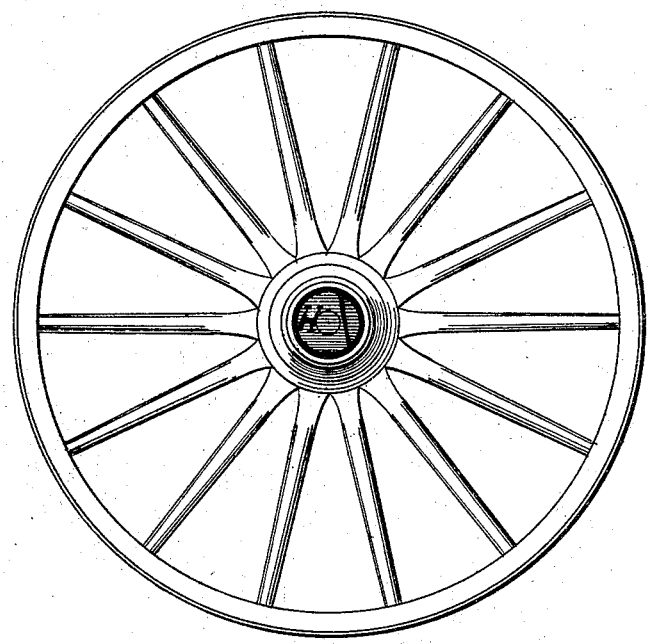
Figure 4:
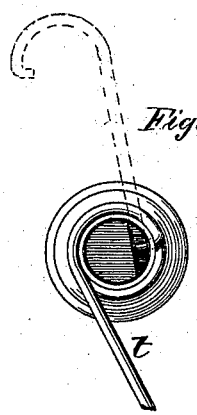
Figure 2:
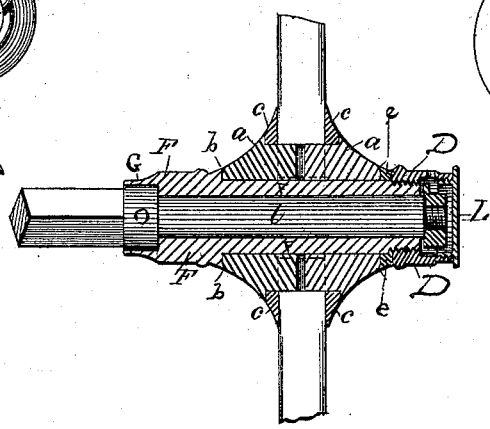
Figure 3:
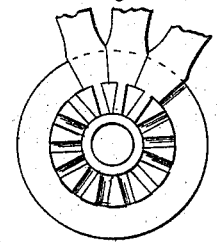

Figure 1 represents an end elevation of my hub. Figs. 2, 3, 4 represent detail views of the same.

$l$ represents the axle of the vehicle, and F the box. Upon this axle is formed the circular enlargement $o$, over which the rear end G of the box snugly fits, so as to form a sand-box, and prevent dust and dirt from working into the box and injuring the axle. Upon the box, near its inner end, is formed a shoulder, the upper edge of which is inclined forward, so as to form a band, $b$, for overlapping the end of the inner half of the wooden hub $a$, for the purpose of preventing the wood from splitting, and holding it more rigidly in position. Each of the wooden halves $a$ of the hub has slots or grooves formed in its inner sides, for receiving the tenons on the ends of the spokes, as shown in Fig. 3. Upon the top of each half $a$ is made a shoulder, which catches behind the rings $c$, that bear against each side of the spokes, so that, as the halves are forced together, they not only clamp the ends of the spokes themselves, but cause the rings to both clamp and brace them rigidly in position. Slipped over the outer end of the box F is a ring or band, $e$, that has its inner end also inclined forward, so as to grasp over the outer end of the outer half of the hub, as shown, to prevent the wood from splitting. Upon the outer end of the box F is screwed the collar or nut D, which has an opening through one side, in which the bent end of the lever $t$ catches, as shown in Fig. 4. By screwing up this nut the two halves $a$ of the hub are clamped firmly and securely together. By removing this nut the hub can be taken apart for the purpose of repairing any part that may become injured. The outer end of the axle extends through the box, and has the nut H screwed upon it to prevent the hub from coming off. One side of this nut is cut away, as seen in Fig. 1, so as to form a shoulder, behind which the straight end of the lever may be made to catch when it is desired to unscrew the nut. By inserting this lever, as shown in Fig. 4, and then revolving the wheel, the nut can be loosened at will. The end of the hub is closed by the cap L.

By making the socket in the rear end of the box and forming the band $b$ upon the box, a box, sand-box, and backband are all formed in a single piece or casting, the advantages of which are apparent to every one skilled in this business.

Having thus described my invention, I claim—

In a hub, the combination of the box F, having the shoulder and band $b$ formed with it, the wooden portions $a$, rings $c$, ring and band $e$, collar D, nut H, and cap L, substantially as shown and described.

In testimony that I claim the foregoing as my own I affix my signature in presence of two witnesses.

WYMAN C. PARTLOW.

Witnesses:
 JOHN A. SMALLEY,
 J. A. SMITH.